United States Patent
Oya et al.

(10) Patent No.: US 12,254,478 B2
(45) Date of Patent: Mar. 18, 2025

(54) DELIVERY DATE ANSWERING APPARATUS AND DELIVERY DATE ANSWERING METHOD

(71) Applicant: Hitachi, Ltd., Tokyo (JP)

(72) Inventors: Kenji Oya, Tokyo (JP); Tazu Nomoto, Tokyo (JP); Takahiro Ogura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/912,261

(22) PCT Filed: Feb. 14, 2022

(86) PCT No.: PCT/JP2022/005696
§ 371 (c)(1),
(2) Date: Sep. 16, 2022

(87) PCT Pub. No.: WO2022/264506
PCT Pub. Date: Dec. 22, 2022

(65) Prior Publication Data
US 2024/0211979 A1    Jun. 27, 2024

(30) Foreign Application Priority Data
Jun. 17, 2021    (JP) ................. 2021-100614

(51) Int. Cl.
*G06Q 30/0202* (2023.01)
*G06Q 10/087* (2023.01)
*G06Q 30/0601* (2023.01)

(52) U.S. Cl.
CPC ....... *G06Q 30/0202* (2013.01); *G06Q 10/087* (2013.01); *G06Q 30/0635* (2013.01)

(58) Field of Classification Search
CPC .......................................... G06Q 10/00–50/00
(Continued)

(56) References Cited

U.S. PATENT DOCUMENTS 7,085,729 B1 *   8/2006   Kennedy .......... G06Q 10/06315
                                                         705/7.22
9,916,550 B2 *   3/2018   Murugan ......... G06Q 10/06315
                                (Continued)

FOREIGN PATENT DOCUMENTS

JP    2004-227454 A    8/2004
JP    2010-244228 A    10/2010
(Continued)

OTHER PUBLICATIONS

International Search Report and Written Opinion, for PCT/JP2022/005696, issued Apr. 19, 2022. 8 pages.

*Primary Examiner* — Alan S Miller
(74) *Attorney, Agent, or Firm* — Volpe Koenig

(57) ABSTRACT

A delivery date answering apparatus includes: an order quota calculation and disclosure unit for calculating surplus inventory of a product in a demand forecast channel, which is a sales channel where order quantities are forecasted, using the actual inventory and a sales plan of the demand forecast channel, and transfer the surplus inventory to an orderable quota for a non-demand forecast channel, which is a sales channel where order quantities are not forecasted, and set a predetermined disclosed quota for the orderable quota; and an actual order acquisition and delivery date answering unit for determining whether the quantity of an actual order acquired in the non-demand forecast channel is within a range of the disclosed quota. When the order is within the range, answer a date when the actual order is deliverable. When the order is not within the range, answer the order is undeliverable.

7 Claims, 12 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 10,726,369 B2* | 7/2020 | Murugan | G06Q 30/08 |
| 2002/0129021 A1* | 9/2002 | Brown | G06Q 10/10 |
| 2002/0138320 A1* | 9/2002 | Robertson | G06Q 10/06 |
| | | | 705/7.12 |
| 2002/0188499 A1* | 12/2002 | Jenkins | G06Q 10/087 |
| | | | 705/28 |
| 2003/0018546 A1* | 1/2003 | Ayala | G06Q 10/06 |
| | | | 705/28 |
| 2004/0024628 A1* | 2/2004 | Eck | G06Q 10/0631 |
| | | | 705/29 |
| 2006/0085296 A1* | 4/2006 | Strickland | G06Q 10/0875 |
| | | | 705/28 |
| 2008/0313058 A1* | 12/2008 | Budnik | G06Q 10/0633 |
| | | | 705/28 |
| 2010/0161365 A1* | 6/2010 | Lokowandt | G06Q 30/0601 |
| | | | 705/28 |
| 2019/0259043 A1* | 8/2019 | Koneri | G06Q 10/087 |
| 2019/0303849 A1* | 10/2019 | Boggarapu | G06Q 10/0835 |
| 2021/0090022 A1* | 3/2021 | Wei | G06Q 10/0875 |
| 2021/0216922 A1* | 7/2021 | Deshapande | G06Q 30/0205 |

FOREIGN PATENT DOCUMENTS

| | | | |
|---|---|---|---|
| JP | 2013-182415 A | 9/2013 |
| JP | 2018-097475 A | 6/2018 |
| KR | 10-2161081 B1 | 9/2020 |

* cited by examiner

DEMAND FORECAST CHANNEL
ACTUAL INVENTORY STORAGE UNIT

FIG.3

THE DEMAND FORECAST CHANNEL SALES
PLAN INVENTORY STORAGE UNIT

8200

| SALES CHANNEL NAME | PRODUCT NAME | SALES PERIOD | PLANNED SALES QUANTITY |
|---|---|---|---|
| ABC ELECTRIC COMPANY | W-X120A | 2021/04/05 | 30 |
| ABC ELECTRIC COMPANY | W-X120A | 2021/04/12 | 40 |
| ABC ELECTRIC COMPANY | W-X120A | 2021/04/19 | 50 |
| ... | ... | ... | ... |
| SUPERMARKET DEF | W-X120A | 2021/04/05 | 30 |
| SUPERMARKET DEF | W-X120A | 2021/04/12 | 20 |
| SUPERMARKET DEF | W-X120A | 2021/04/19 | 20 |
| ... | ... | ... | ... |
| ABC ELECTRIC COMPANY | R-C400X | 2021/04/05 | 25 |
| ABC ELECTRIC COMPANY | R-C400X | 2021/04/12 | 35 |
| ABC ELECTRIC COMPANY | R-C400X | 2021/04/19 | 30 |
| ... | ... | ... | ... |

8201　　8202　　8203　　8204

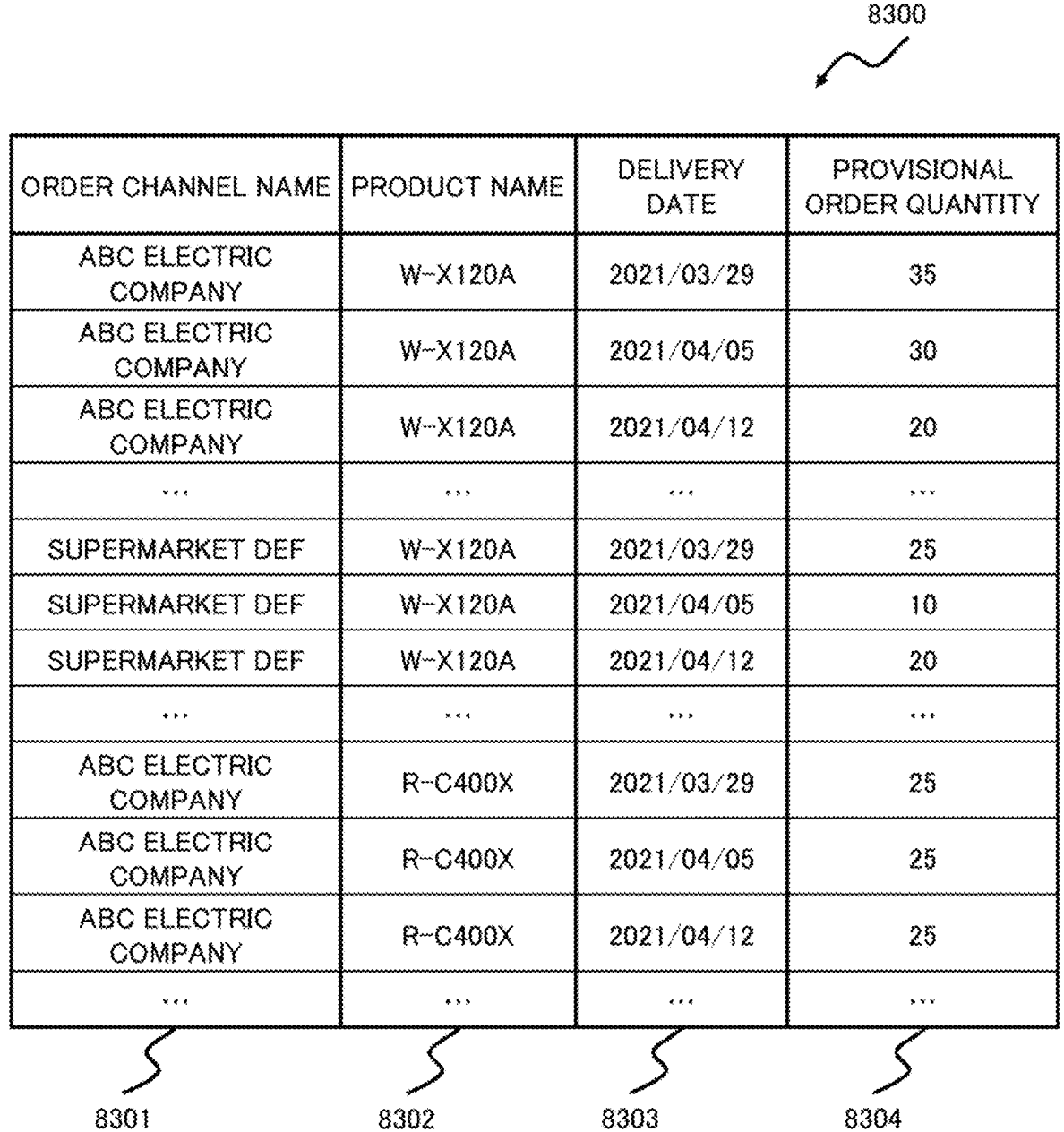

FIG.5

SUPPLY PLAN STORAGE UNIT

8400

| PRODUCT NAME | SUPPLY PERIOD | PLANNED SUPPLY QUANTITY |
|---|---|---|
| W-X120A | 2021/03/29 | 150 |
| W-X120A | 2021/04/05 | 120 |
| W-X120A | 2021/04/12 | 100 |
| ... | ... | ... |
| R-C400X | 2021/03/29 | 140 |
| R-C400X | 2021/04/05 | 90 |
| R-C400X | 2021/04/12 | 110 |
| ... | ... | ... |
| D-49X21 | 2021/03/29 | 200 |
| D-49X21 | 2021/04/05 | 120 |
| D-49X21 | 2021/04/12 | 150 |
| ... | ... | ... |

ACTUAL ORDER INFORMATION STORAGE UNIT

8600

| ORDER CHANNEL NAME | PRODUCT NAME | DELIVERY DATE | ACTUAL ORDER QUANTITY |
|---|---|---|---|
| ABC ELECTRIC COMPANY | W-X120A | 2021/03/01 | 32 |
| ABC ELECTRIC COMPANY | W-X120A | 2021/03/08 | 28 |
| ABC ELECTRIC COMPANY | W-X120A | 2021/03/15 | 35 |
| ... | ... | ... | ... |
| SUPERMARKET DEF | W-X120A | 2021/03/01 | 26 |
| SUPERMARKET DEF | W-X120A | 2021/03/08 | 23 |
| SUPERMARKET DEF | W-X120A | 2021/03/15 | 30 |
| ... | ... | ... | ... |
| MANUFACTURER'S DIRECT SALES EC | W-X120A | 2021/03/01 | 5 |
| MANUFACTURER'S DIRECT SALES EC | W-X120A | 2021/03/08 | 4 |
| MANUFACTURER'S DIRECT SALES EC | W-X120A | 2021/03/15 | 5 |
| ... | ... | ... | ... |

EXAMPLE OF THE UPDATED SUPPLY PLAN

| PRODUCT NAME | PERIOD | PRODUCTION QUANTITY | MANUFACTURER'S INVENTORY | SUPPLY QUANTITY |
|---|---|---|---|---|
| W-X120A | ACTUAL | | 250 | |
| W-X120A | 2021/03/29 | 170 | 270 | 150 |
| W-X120A | 2021/04/05 | 70 | 220 | 120 |
| W-X120A | 2021/04/12 | 120 | 240 | 100 |
| ... | ... | ... | ... | ... |

FIG.10

EXAMPLE OF A CALCULATION OF A DEGREE OF A SURPLUS INVENTORY

ABC ELECTRIC COMPANY

8550

| PRODUCT NAME | PERIOD | PURCHASED QUANTITY | SALES QUANTITY | INVENTORY PLAN | ACTUAL INVENTORY | SURPLUS INVENTORY |
|---|---|---|---|---|---|---|
| W-X120A | ACTUAL | | | 70 | 85 | +15 |
| W-X120A | 2021/03/29 | 30 | 30 | 70 | (85) | +15 |
| W-X120A | 2021/04/05 | 60 | 40 | 90 | (105) | +15 |
| W-X120A | 2021/04/12 | 40 | 50 | 80 | (95) | +15 |
| ... | ... | ... | ... | ... | ... | ... |

8551　8552　8553　8554　8555　8556　8557

SUPER MARKET DEF

8560

| PRODUCT NAME | PERIOD | PURCHASED QUANTITY | SALES QUANTITY | INVENTORY PLAN | ACTUAL INVENTORY | SURPLUS INVENTORY |
|---|---|---|---|---|---|---|
| W-X120A | ACTUAL | | | 50 | 40 | 0 |
| W-X120A | 2021/03/29 | 30 | 30 | 50 | (40) | 0 |
| W-X120A | 2021/04/05 | 10 | 20 | 40 | (30) | 0 |
| W-X120A | 2021/04/12 | 20 | 20 | 40 | (30) | 0 |
| ... | ... | ... | ... | ... | ... | ... |

8561　8562　8563　8564　8565　8566　8567

TOTAL

8570

| PRODUCT NAME | PERIOD | PURCHASED QUANTITY | SALES QUANTITY | INVENTORY PLAN | ACTUAL INVENTORY | SURPLUS INVENTORY |
|---|---|---|---|---|---|---|
| W-X120A | ACTUAL | | | 315 | 330 | +15 |
| W-X120A | 2021/03/29 | 150 | 150 | 315 | (330) | +15 |
| W-X120A | 2021/04/05 | 120 | 165 | 270 | (285) | +15 |
| W-X120A | 2021/04/12 | 100 | 105 | 265 | (280) | +15 |
| ... | ... | ... | ... | ... | ... | ... |

DISCLOSED QUOTA DISPLAY SCREEN

MODEL W-X120A

| DEMAND FORECAST CHANNEL | ACTUAL INVENTORY | SALES PLAN | BASE INVENTORY | SURPLUS INVENTORY | PROVISIONAL ORDER | ORDER QUOTA |
|---|---|---|---|---|---|---|
| ABC ELECTRIC COMPANY | 85 | 35 | 70 | +15 | 35 | 20 |
| SUPERMARKET DEF | 40 | 25 | 50 | -10 | 25 | 25 |
| GHI MALL | 30 | 15 | 30 | 0 | 15 | 15 |
| ... | ... | ... | ... | ... | ... | ... |
| TOTAL | 330 | 170 | — | — | 180 | 150 |

| SUPPLY PLAN | 150 |
|---|---|
| AVAILABLE DISCLOSED QUOTA | 15 |
| AVERAGE SALES PERFORMANCE | 4.8 |
| DISCLOSED QUOTA | 5 |

ORDER REQUEST SCREEN

DELIVERY DATE ANSWERING APPARATUS AND DELIVERY DATE ANSWERING METHOD

TECHNICAL FIELD

The present invention relates to a delivery date answering apparatus and a delivery date answering method. The present invention claims priority of Japanese patent application number 2021-100614 filed on Jun. 17, 2021, and for designated countries where incorporation by reference of references is permitted, the contents of that application are incorporated by reference into the present application.

BACKGROUND ART

PTL 1 describes a technique of "commercial transaction support system, which is the one that provides commercial transaction support systems that enable a food and beverage store to increase safety and reliability of transactions when purchasing a product, comprising: means for controlling an acceptance of a product order from the food and beverage store so that the order is fulfilled to the extent that it can be sold in view of the amount of inventory; means for instructing a distribution center to ship the product based on a content of the order placed by the food and beverage store; means to manage inventory data based on information from the distribution center; means of determining which one of distributors should record sales in response to orders from the food and beverage store; and means for generating the information necessary to process sales proceeds of a provider and the distributors in the case where the distributor is deemed to have purchased the product ordered by the food and beverage store from the provider and sold it to the food and beverage store, and providing such information to the provider and the distributor".

CITATION LIST

Patent Literature

PTL 1: JP-A-2018-097475

SUMMARY OF INVENTION

Technical Problem

The technology described in the above document 1 does not present anything about providing a reserve and delivery date answer when an order is received from a sales channel that cannot accept provisional orders, even in the absence of an estimate of demand for that channel.

An object of the present invention is to provide appropriate reserve and delivery date answer for sales channel that does not have demand estimates.

Solution to Problem

In order to solve the above problem, the present application employs, for example, a technique described in the claims. The invention includes a plurality of means for solving the above problems, and an example thereof is a delivery date answering apparatus including: an order quota calculation and disclosure unit configured to calculate a surplus inventory of a product in a demand forecast channel, which is a sales channel for which order quantities are forecasted, by using an actual inventory and a sales plan of the demand forecast channel, and transfer the surplus inventory to an orderable quota for a non-demand forecast channel, which is a sales channel for which order quantities are not forecasted, and set a predetermined disclosed quota for the orderable quota; and an actual order acquisition and delivery date answering unit configured to determine whether an order quantity of an actual order acquired in the non-demand forecast channel is within a range of the disclosed quota and, when the actual order is within the range, answer a delivery date as the actual order is deliverable and, when the actual order is not within the range, answer the delivery date as the actual order is undeliverable.

Advantageous Effect

The present invention can provide a technique to properly provide reserve and delivery date answer for a sales channel that does not have demand estimates.

Problems to be solved, configurations, and effects other than those described above will be apparent from the description of the following embodiments.

BRIEF DESCRIPTION OF DRAWINGS

FIG. 3 shows an example of a data structure of a demand forecast channel sales plan storage unit.
FIG. 4 shows an example of a data structure of a demand forecast channel provisional order information storage unit.
FIG. 5 shows an example of a data structure of a supply plan storage unit.
FIG. 6 shows an example of a data structure of an actual order information storage unit.
FIG. 9 shows an example of an updated supply plan.
FIG. 10 shows an example of a calculation of a degree of a surplus inventory.
FIG. 11 shows an example of a disclosed quota display screen for a product supplier.

DESCRIPTION OF EMBODIMENTS

Figure 1:
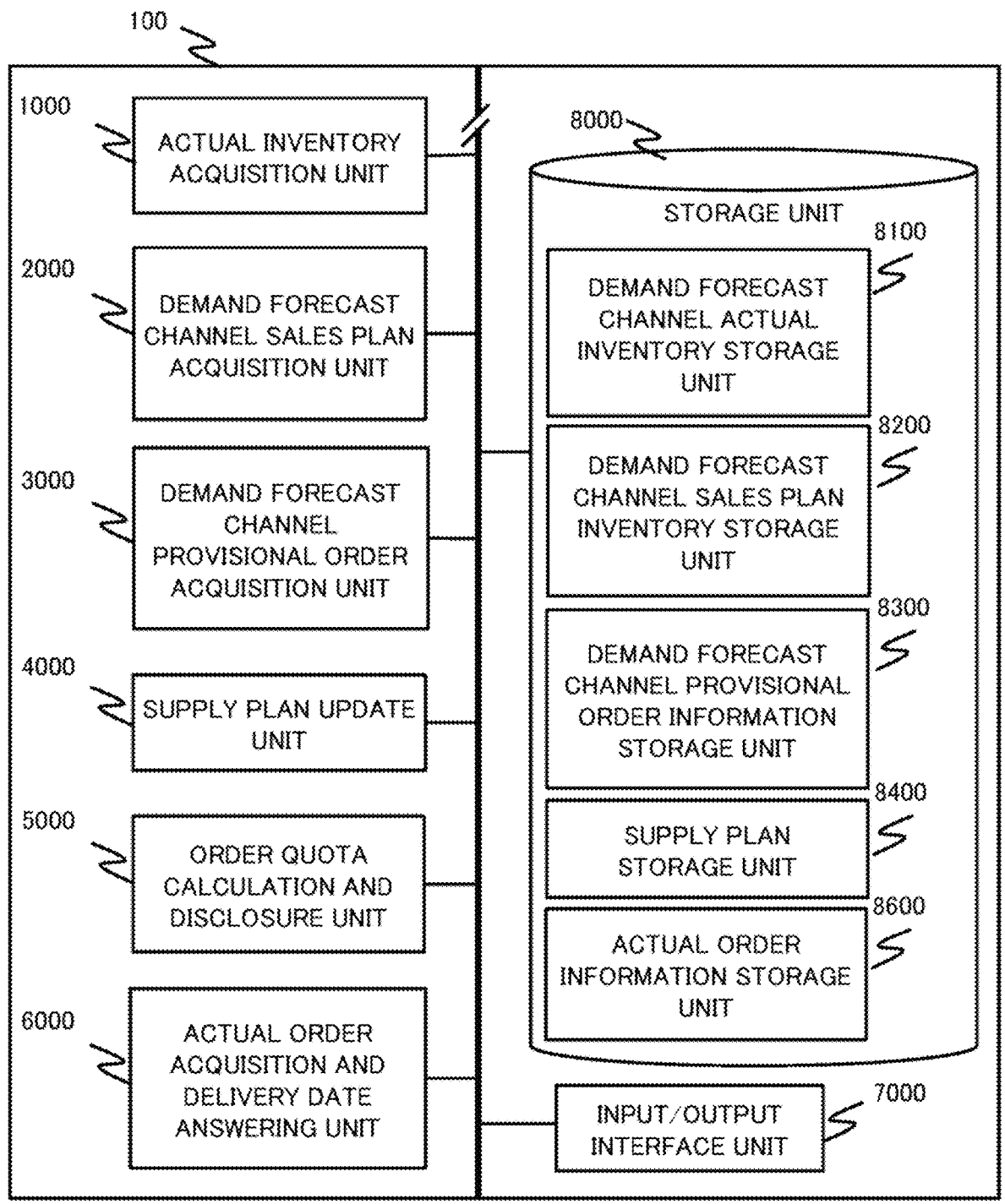
FIG. 1 shows an example of a configuration of a delivery date answering apparatus.

In the following embodiments, description may be divided into plural sections or embodiments when necessary for convenience. Unless particularly specified, the sections or embodiments are not independent of each other, but have a relation such that one is a modification, detailed description, supplementary description, or the like of a part or all of the others.

In the following embodiments, when the number and the like (including the number, a numeric value, an amount, a range, and the like) of an element is referred to, the number and the like is not limited to a specific number, and may be equal to, greater than or less than the specific number, unless otherwise specified or clearly limited to the specific number in principle.

Further, in the embodiments described below, it is needless to say that the constituent elements (including element steps) are not always mandatory unless otherwise stated or considered as apparently mandatory in principle.

Similarly, in the following embodiments, when reference is made to shapes, positional relations, and the like of the constituent elements and the like, those having substantially approximate or similar shapes and the like are inclusive unless otherwise particularly specified or considered to be clearly not inclusive in principle. This is also the case for numeric values and ranges.

In all the drawings for illustrating the embodiments, the same members are denoted by the same reference numerals in principle, and repetitive descriptions thereof will be omitted. However, a different reference numeral or name may be given to the same member when a name shared by members before and after a change due to an environmental change and the like is highly probable to cause confusion.

In the following embodiments, the "input/output interface unit" may be one or more interface devices. The one or more interface devices may be at least one of the following:

One or more I/O (Input/Output) interface devices. The I/O interface device is an interface device for at least one of an I/O device and a remote display computer. The I/O interface device for the display computer may be a communication interface device. At least one of the I/O devices may be a user interface device, e.g., an input device such as a keyboard and pointing device, or an output device such as a display device; and One or more communication interface devices. The one or more communication interface devices may be one or more similar kinds of communication interface devices (e.g., one or more NICs (Network Interface Components)) or two or more similar kinds of communication interface devices (e.g., NIC and HBA (Host Bus Adapter)).

In the following description, "memory" is one or more memory devices that are examples of one or more storage devices, which can typically be a main memory device. At least one memory device in the memory may be a volatile memory device or a non-volatile memory device.

In the following description, "persistent memory storage" may be one or more persistent memory devices, which are examples of one or more memory devices. A persistent storage device may typically be a non-volatile storage device (e.g., an auxiliary storage device), specifically, for example, a HDD (hard disk drive), SSD (Solid State Drive), NVME (Non-Volatile Memory Express) drives, or SCM (Storage Class Memory) drives.

In the following description, "memory unit" or "storage device" can be memory or both of memory and persistent storage device.

In the following description, a "processing unit" or "processor" may be one or more processor devices. At least one processor device may typically be a CPU (Central Processing Unit), but may also be another type of processor device, such as a GPU (Graphics Processing Unit). At least one processor device may be single-core or multi-core. At least one processor device may be a processor core. At least one processor device may be a circuit that is a collection of gate arrays (e.g., an FPGA (Field-Processing Gate Array)) with a hardware description language that performs some or all of the processing, a CPLD (Complex Programmable Logic Device) or ASIC (Application Specific Integrated Circuit), which are processor devices in the broad sense.

In the following description, the functions may be described by the expression "yyy unit", but the functions may be realized by one or more computer programs being executed by a processor, or by one or more hardware circuits (e.g., FPGA or ASIC) or a combination thereof. When a function is realized by the program being executed by a processor, the function may be at least a part of the processor, since the defined processing is performed while appropriately using storage and/or interface devices and the like. A function explained as subject may also be a process performed by a processor or a device having the processor. The program may be installed from a program source. The program source may be, for example, a computer-readable recording medium (e.g., a non-transitory recording medium) that can be read by a program distribution computer or a computer. The description of each function is an example, and multiple functions may be combined into a single function or a single function may be split into multiple functions.

In the following description, a "program" or "processing unit" may be used as the subject to describe a process, but a process described with a program as the subject may also be a process performed by a processor or a device having the processor. Two or more programs may be realized as one program, or one program may be realized as two or more programs.

In the following explanation, the expression "xxx table" may be used to describe information that produces an output for an input, but this information can be a table of any structure, or a learning model such as a neural network, genetic algorithm, or random forest that generates outputs for inputs. Thus, the "xxx table" can be referred to as the "xxx information". In the following description, the structure of each table is an example, and one table may be divided into two or more tables, or all or part of two or more tables may be one table.

In the following description, a "delivery date answering apparatus" may be a system consisting of one or more physical computers, or it may be a system (e.g., a cloud computing system) realized on a group of physical computing resources (e.g., a cloud infrastructure). "Displaying" of the information for display by the delivery date answering apparatus 100 may be the displaying of the information for display on a display device possessed by the computer, or it may be the transmission of the information for display by the computer to the computer for display (in the latter case, the information for display is displayed by the computer for display). In the following, each embodiment of the present invention will be described while referring to the drawings.

Diversification of consumer needs and the development of information technology and logistics networks have led to the diversification of sales channels in recent years. Manufacturers now have not only affiliated dealers but also so-called large-lot channels such as large volume retailers and so-called small-lot channels such as direct sales through internet shopping as sales channels. In addition, sales transactions are becoming increasingly electronic. In response to these social trends, the importance of efficiently matching supply and demand among a wide variety of consumers and suppliers is increasing.

In the large-lot channel, dealers generally hold a certain amount of inventory to avoid sales opportunity losses. Therefore, dealers in the large-lot channel tend to increase order quantities (hereinafter also referred to as "demand") of products to manufacturers. Therefore, manufacturers, by customary practice, forecast the order quantity for each channel, determine the production quantity by setting an order quota, which is the quantity that can actually be supplied within the forecasted range, and formulate a supply plan for the products.

On the other hand, in the small-lot channel, such as direct Internet sales, it is difficult for manufacturers to estimate order quantities, and decisions on production quantity are often made based on a combination of the manufacturer's inventory risk. Under these circumstances, when it is able to acquire and sell orders in the small-lot channel to make up for the surplus inventory left over due to order forecasting errors in the large-lot channel, it may lead to inventory adjustments and reduced risk.

According to the present invention, order quota for sales channels that do not have any forecasts or do not forecast order quantities (hereinafter referred to as "non-demand forecast sales channels") can be generated based a degree of a surplus inventory that is calculated from the actual inventory and sales plan of sales channels that have forecasts or do forecast order quantities (hereinafter referred to as "demand forecast channels"). This enables the prevention of excess supply that exceeds the sales capacity of the sales channel with an order quantity forecast and the reduction of lost sales opportunities by enabling the disclosure of order quota and delivery date answer to sales channels without an order quantity forecast.

Example 1

FIG. 1 shows an example of a configuration of a delivery date answering apparatus. The delivery date answering apparatus 100 is connected to and can communicate with a network such as the internet, which is not shown in the figure. The network is, for example, a LAN (Local Area Network), WAN (Wide Area Network), VPN (Virtual Private Network), and the internet, which use general public lines in whole or in part, a cell phone communication network, or a composite network of any of these. The network may be a wireless communication network such as Wi-Fi (registered trademark) or 5G (Generation).

The delivery date answering apparatus 100 has, as processing units, an actual inventory acquisition unit 1000, a demand forecast channel sales plan acquisition unit 2000, a demand forecast channel provisional order acquisition unit 3000, a supply plan update unit 4000, an order quota calculation and disclosure unit 5000, an actual order acquisition and delivery date answering unit 6000. The delivery date answering apparatus 100 also has an input/output interface unit 7000, and a memory unit 8000.

The memory unit 8000 includes a demand forecast channel actual inventory storage unit 8100, a demand forecast channel sales plan storage unit 8200, a demand forecast channel provisional order information storage unit 8300, a supply plan storage unit 8400, and an actual order information storage unit 8600.

Figure 2:
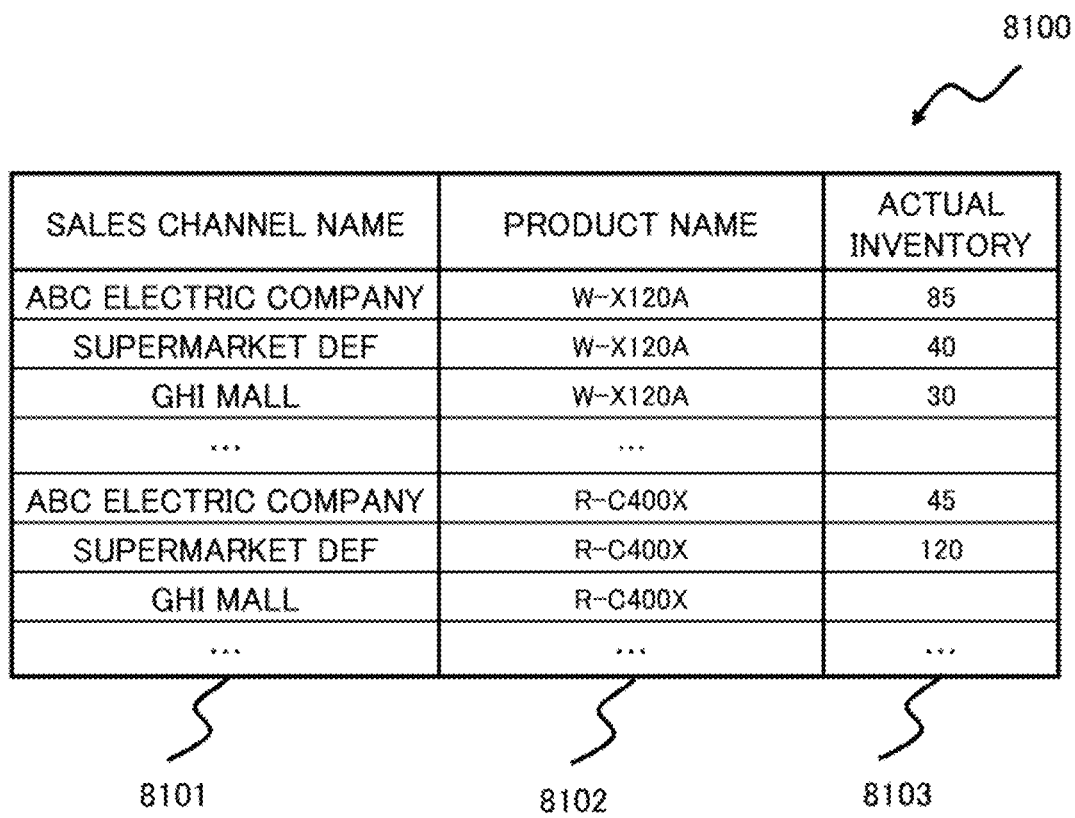
FIG. 2 shows an example of a data structure of a demand forecast channel actual inventory storage unit.

FIG. 2 shows an example of a data structure of the demand forecast channel actual inventory storage unit. The demand forecast channel actual inventory storage unit 8100 include three field of a sales channel name 8101, a product name 8102, and an actual inventory 8103. The demand forecast channel actual inventory storage unit 8100 associates the handled products with their actual inventories for each demand forecast channel and stores them.

FIG. 3 shows an example of a data structure of the demand forecast channel sales plan storage unit. The demand forecast channel sales plan storage unit 8200 includes four field of a sales channel name 8201, a product name 8202, a sales period 8203, and a planned sales quantity 8204. The demand forecast channel sales plan storage unit 8200 associates and stores the planned sales quantity of the handled products according to the demand forecast channel and the sales period.

Although the present embodiment presents an example of using weekly data with sales periods separated by weeks, data separated by other time units (daily, monthly, and the like) may also be used. It is desirable to align the frequency of using the delivery date answering apparatus 100 with the unit of time of the sales period. For example, when the delivery date answering apparatus 100 is used on a daily basis, planned sales quantity by day is more preferably used. When the delivery date answering apparatus 100 is used on a monthly basis, planned sales quantity by month is more preferably used.

FIG. 4 shows an example of a data structure of the demand forecast channel provisional order information storage unit. The demand forecast channel provisional order information storage unit 8300 includes four field of an order channel name 8301, a product name 8302, a delivery date 8303, and a provisional order quantity 8304. That is, the demand forecast channel provisional order information storage unit 8300 stores the provisional order quantity by product and by delivery date from the sales channel, i.e., the number of orders that are scheduled to deliver the product.

In the present embodiment, as in the demand forecast channel sales plan storage unit 8200, an example is presented in which the time units for delivery date are separated into weekly units, but data separated by other time units (daily, monthly, and the like) may also be used. It is desirable to align the frequency of using the delivery date answering apparatus 100 with the unit of time of the delivery date. For example, when the delivery date answering apparatus 100 is used on a daily basis, it is more preferable to use the daily delivery date and the daily provisional order quantity. For example, when the delivery date answering apparatus 100 is used on a monthly basis, it is more preferable to use the monthly delivery date and the monthly provisional order quantity.

FIG. 5 shows an example of a data structure of the supply plan storage unit. The supply plan storage unit 8400 includes three filed of a product name 8401, a supply period 8402, and a planned supply quantity 8403. That is, the supply plan storage unit 8400 stores the planned supply quantity of the company, i.e., manufacturer, that supplies the product for each supply period of the product.

In the present embodiment, as in the demand forecast channel sales plan storage unit 8200, an example is presented in which the time units for supply period are separated into weekly units, but data separated by other time units (daily, monthly, and the like) may also be used. It is desirable to align the frequency of using the delivery date answering apparatus 100 with the unit of time of the delivery date. For example, when the delivery date answering apparatus 100 is used on a daily basis, it is more preferable to use the daily supply period and the daily planned supply quantity. When the delivery date answering apparatus 100 is used on a monthly basis, it is more preferable to use the monthly supply period and the monthly planned supply quantity.

FIG. 6 shows an example of a data structure of the actual order information storage unit. The actual order information storage unit 8600 includes four field of an order channel name 8601, a product name 8602, a delivery date 8603, and an actual order quantity 8604. That is, the actual order information storage unit 8600 stores the actual order quantity by product and by delivery date from the sales channel, i.e., the number of orders for which products are actually delivered.

In the present embodiment, as in the demand forecast channel sales plan storage unit 8200, an example is presented in which the time units for delivery date are separated into weekly units, but data separated by other time units (daily, monthly, and the like) may also be used. It is desirable to align the frequency of using the delivery date answering apparatus 100 with the unit of time of the delivery date. For example, when the delivery date answering apparatus 100 is used on a daily basis, it is more preferable to use the daily delivery date and the daily actual order quantity. When the delivery date answering apparatus 100 is used on a monthly basis, it is more preferable to use the monthly delivery date and the monthly actual order quantity.

Returning to the explanation of FIG. 1, the actual inventory acquisition unit 1000 acquires actual inventory for the demand forecast channel. Specifically, the actual inventory acquisition unit 1000 acquires the actual inventory of the sales channel through the communication with the sales channel that is provided by the input/output interface unit 7000, and stores it in the demand forecast channel actual inventory storage unit 8100.

The demand forecast channel sales plan acquisition unit 2000 acquires the sales plan of the sales channel itself. Specifically, the demand forecast channel sales plan acquisition unit 2000 acquires, through the communication with the demand forecast channel provided by the input/output interface unit 7000 or by an input device, sales plan information that the sales channel plans for customers, and stores it in the demand forecast channel sales plan storage unit 8200.

The demand forecast channel provisional order acquisition unit 3000 acquires provisional orders obtained through preliminary discussions with customers and other means. Specifically, the demand forecast channel provisional order acquisition unit 3000 acquires, through the communication with the demand forecast channel provided by the input/output interface unit 7000 or by an input device, provisional order information obtained through preliminary negotiations between a company supplying the product and the demand forecast channel, and stores it in the demand forecast channel provisional order information storage unit 8300.

The supply plan update unit 4000 updates the supply plan, which is calculated using the production and inventory plans of the companies supplying the products to be ordered. Specifically, the supply plan update unit 4000 uses the production and inventory plans of the company supplying the product to update the supply plan storage unit 8400.

The order quota calculation and disclosure unit 5000 calculates the surplus inventory in the sales channel using the actual inventory and the sales plan in the demand forecast channel, and transfers the surplus inventory to an orderable quota for a non-demand forecast channel, and sets a disclosed quota as the maximum amount that can be received at one time for some or all of the surplus inventory. Specifically, the order quota calculation and disclosure unit 5000 uses the demand forecast channel actual inventory storage unit 8100 and the demand forecast channel sales plan storage unit 8200 to calculate the surplus inventory of the sales channel. Then, the order quota calculation and disclosure unit 5000 transfers the surplus inventory of the demand forecast channel to the maximum order quota of the non-demand forecast channel, and calculates the disclosed quota of non-demand forecast channel using the past actual orders, which are stored in the memory unit 8000 and not shown in the figure, and the maximum order quota for the non-demand forecast channel.

The reason for providing the disclosed quota based on the actual order, i.e., providing the disclosed quota according to the size of demand, is to serve as a safety valve to avoid the risk of product supply to the small-lot channel market on an unanticipated scale. More specifically, when the size of the order quantity of the large-lot channel is extremely large in relation to the demand size of the small-lot channel, a large forecast error in the order size of the large-lot channel causes a large fluctuation in the number of products available for sale in the small-lot channel, resulting in the supply of products to the market on an unexpected scale and creating the impression of oversupply. By providing a disclosed quota, the impression of oversupply and the receipt of a large number of orders from the small-lot channel at one time can be avoided.

When the manufacturer receives the actual order, the actual order acquisition and delivery date answering unit 6000 determines whether the order falls within the range of the disclosed quota calculated by the order quota calculation and disclosure unit 5000, and then answers the delivery date to the order. Specifically, the actual order acquisition and delivery date answering unit 6000 acquires actual order information through the communication with the sales channel provided by the input/output interface unit 7000. Then, the actual order acquisition and delivery date answering unit 6000 generates the answer stating that the order can be delivered when the order quantity is within the range of the disclosed quota, or that the order cannot be delivered when the order quantity is outside the range of the disclosure quota. Then, the actual order acquisition and delivery date answering unit 6000 presents the answer to the orderer through the communication with the sales channel.

The input/output interface unit 7000 outputs at least the order quota, the disclosed quota, and the display and the transmission of the delivery date answer, and accepts various data inputs. Specifically, the input/output interface unit 7000 acquires the actual inventory of the demand forecast channel, the sales plans, and the provisional order information, acquires actual order information for each sales channel, generates and transmits the screens that output the processing results, and provide the processing results to each sales channel.

Figure 7:
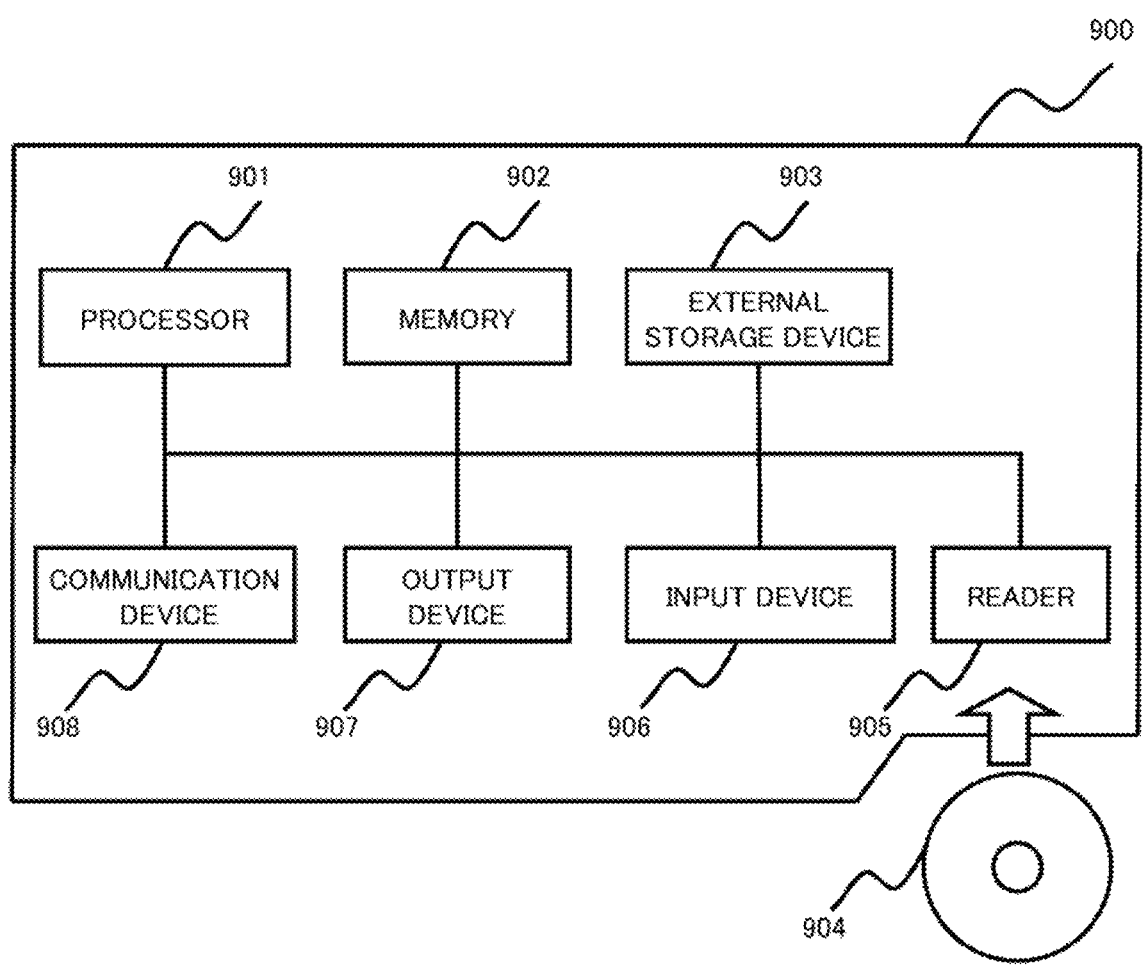
FIG. 7 shows an example of a hardware configuration of a delivery date answering apparatus.

FIG. 7 shows an example of a hardware configuration of the delivery date answering apparatus. The delivery date answering apparatus 100 can be realized by a general computer 900 that includes a processor (e.g., CPU (Central Processing Unit) or GPU (Graphics Processing Unit)) 901, a memory 902 such as RAM (Random Access Memory), an external storage device 903 such as a hard disk device (Hard Disc Drive: HDD) or SSD (Solid State Drive), a reader 905 that reads information on a portable storage medium such as a CD (Compact Disk) or DVD (Digital Versatile Disk), an input device 906 such as a keyboard, mouse, barcode reader, touch panel and the like, an output device 907 such as a display, and a communication device 908 that communicates with other computers via a network such as a LAN or the internet. The delivery date answering apparatus 100 can also be realized by a network system equipped with the plurality of the general computer 900. Note that the reader 905 may be capable of not only reading but also writing the portable storage medium 904.

The processor 901 executes various processes by executing a predetermined delivery date answering program loaded from the external storage device 903 to the memory 902. The delivery date answering program is, for example, an application program that can be executed on an OS (Operating System) program. The delivery date answering program may, for example, be installed in the external storage device 903 from the portable storage medium 904 via a reader 905, or it may be downloaded from a network via the communication device 908 and executed by processor 901.

For example, the actual inventory acquisition unit 1000, the demand forecast channel sales plan acquisition unit 2000, the demand forecast channel provisional order acquisition unit 3000, the supply plan update unit 4000, the order quota calculation and disclosure unit 5000, and the actual order acquisition and delivery date answering unit 6000 can be realized by loading the delivery date answering program stored in the external storage device 903 into the memory 902 and executing it by the processor 901. The input/output interface unit 7000 can be realized by the processor 901 using the input device 906, the output device 907, and the communication device 908. The memory unit 8000 can be realized by the processor 901 using the memory 902 or the external storage device 903.

Figure 8:
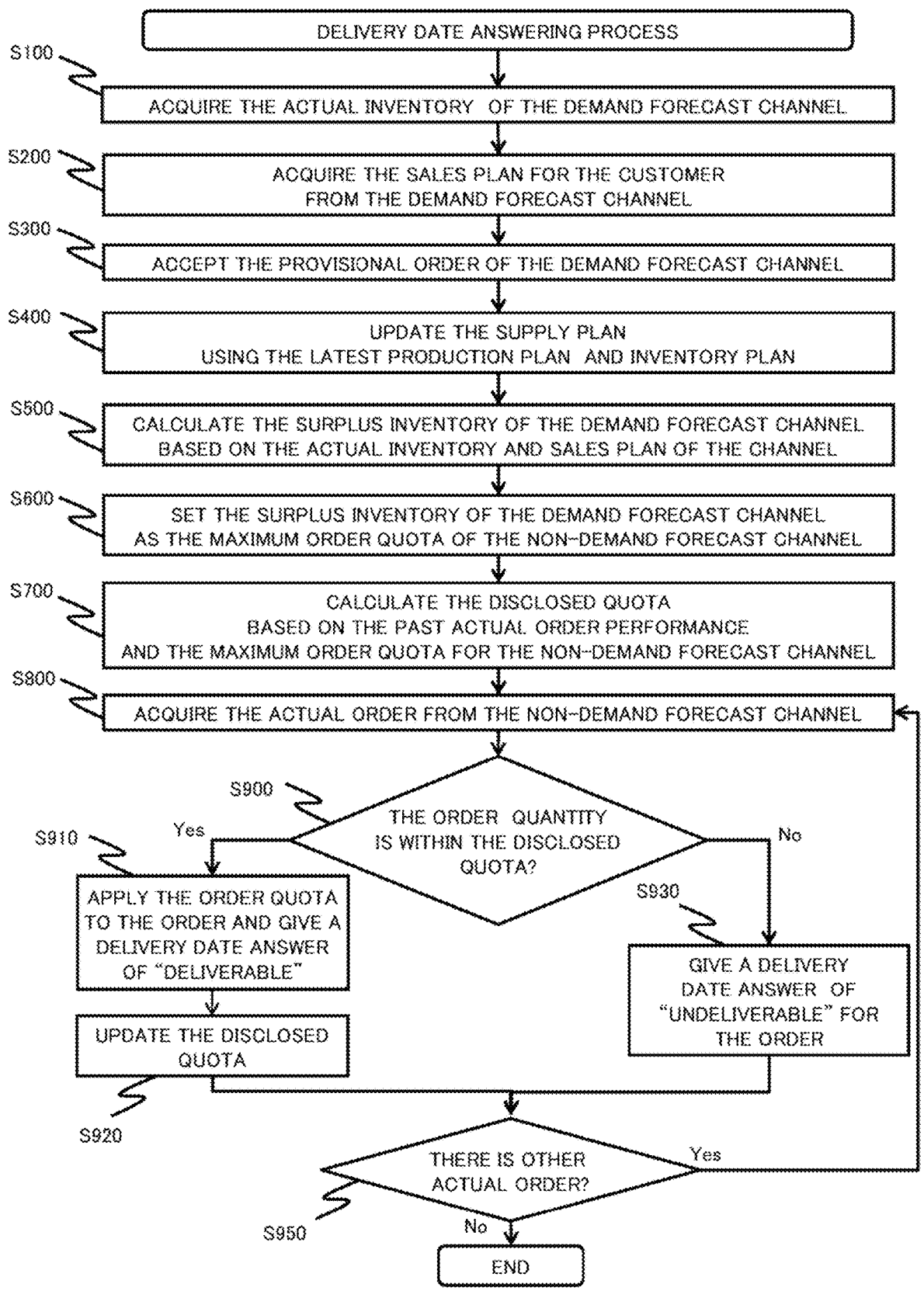
FIG. 8 shows an example of a flowchart of a delivery date answering process.

FIG. 8 shows an example of a flowchart of a delivery date answering process. The delivery date answering process is initiated at a predetermined frequency (e.g., hourly) or when an actual order is received. Alternatively, the delivery date answering process is initiated when the delivery date answering apparatus 100 is instructed to start the process.

First, the actual inventory acquisition unit 1000 acquires the actual inventory of the demand forecast channel (step S100). Specifically, the actual inventory acquisition unit 1000 acquires the actual inventory of the sales channel through the communication with the sales channel that is provided by the input/output interface unit 7000, and stores it in the demand forecast channel actual inventory storage unit 8100.

Then, the demand forecast channel sales plan acquisition unit 2000 acquires the sales plan for the customer from the demand forecast channel (step S200). Specifically, the demand forecast channel sales plan acquisition unit 2000 acquires, through the communication with the demand forecast channel provided by the input/output interface unit 7000 or by an input device 906, sales plan information that the sales channel plans for customers, and stores it in the demand forecast channel sales plan storage unit 8200.

Then, the demand forecast channel provisional order acquisition unit 3000 accepts the input of the provisional order of the demand forecast channel (step S300). Specifically, the demand forecast channel provisional order acquisition unit 3000 acquires, through the communication with the demand forecast channel provided by the input/output interface unit 7000 or by an input device 906, provisional order information obtained through preliminary negotiations between a company (manufacturers) supplying the product and the demand forecast channel, and stores it in the demand forecast channel provisional order information storage unit 8300.

Then, the supply plan update unit 4000 updates the supply plan using the latest production plan and inventory plan (step S400). Specifically, the supply plan update unit 4000 uses the production and inventory plans of the company supplying the product to update the supply plan storage unit 8400.

FIG. 9 shows an example of the updated supply plan. First, the supply plan update unit 4000 obtains the latest production plan held by the company supplying the product. In the example 8450 in FIG. 9, information is obtained that shows that the product whose product name 8451 is "W-X120A" is produced with the production quantity 8454 of "170 units" in the period 8452 of "2021/03/29". Moreover, the production plan is obtained for the production quantity 8454 of "70 units" in the period 8452 of "2021/04/05", and the production quantity 8454 of "120 units" in the period 8452 of "2021/04/12".

Next, the supply plan update unit 4000 obtains the latest inventory plan that the company supplying the product has. In the example in FIG. 9, the inventory plan is obtained that show that the product whose product name 8451 is "W-X120A" is in stock with manufacturer's inventory 8455 of "270 units" in the period 8452 of "2021/03/29", with manufacturer's inventory 8455 of "220 units" in the period 8452 of "2021/04/05", and with manufacturer's inventory 8455 of "240 units" in the period 8452 of "2021/04/12".

Next, the supply plan update unit 4000 defines N as a variable indicating the period, and calculates the value by the formula "the number of units in stock in N−1 (past one unit period before N)+produced quantity in N−the number of units in stock in N" as the planned supply quantity in the period N, and store the calculated value correspondingly as the supply quantity 8453 of the supply plan storage unit 8400. For example, when N−1=2021/03/29 and N=2021/04/05, in the example of the values in FIG. 9, the supply quantity 8453 in 2021/04/05 is calculated as "270+70−220=120", and the supply plan storage unit 8400 is updated.

Then, the order quota calculation and disclosure unit 5000 calculates the surplus inventory of the sales channel based on the actual inventory and sales plan of the demand forecast channel (step S500). Specifically, order quota calculation and disclosure unit 5000 calculates the surplus inventory of the sales channel based on the demand forecast channel actual inventory storage unit 8100 and the demand forecast channel sales plan storage unit 8200.

FIG. 10 shows an example of a calculation of a degree of a surplus inventory. In the calculation example 8550, an example of the surplus inventory calculated from the inventory plan and sales plan of the demand forecast channel unit of the home appliance mass sales company "ABC Electric Company", which is a large channel, is shown. Among the actual inventory 8556, values not enclosed in parentheses are the actual inventory. The sales quantity 8554 is the value of the sales plan. In addition, the purchased quantity 8553 and the inventory plan 8555 are the values that are planned before one unit period, and in the example in FIG. 10, they show the plan of the purchase and the inventory planned at the time of "2021/03/22". The value enclosed in parentheses of the actual inventory 8556 is the inventory forecast value obtained by calculating receipts and payments (inventory units in N−1+purchased quantity in N−actual sales quantity in N) using the actual inventory as well as the purchase and sales plan.

In the calculation example 8560, an example of the surplus inventory calculated from the inventory plan and sales plan of the demand forecast channel unit of the general retail company "Supermarket DEF", which is a large channel, is shown. Among the actual inventory 8566, values not enclosed in parentheses are the actual inventory. The sales quantity 8564 is the value of the sales plan. In addition, the purchased quantity 8563 and the inventory plan 8565 are the values that are planned before one unit period, and in the example in FIG. 10, they show the plan of the purchase and the inventory planned at the time of "2021/03/22". The value enclosed in parentheses of the actual inventory 8556 is the inventory forecast value obtained by calculating receipts and payments (inventory units in N−1+purchased quantity in N−actual sales quantity in N) using the actual inventory as well as the purchase and sales plan.

In the calculation example 8570, an example of the total surplus inventory of the entire demand forecast channel including "ABC Electric Company" and "Supermarket DEF" which are large channels is shown. Among the actual inventory 8576, values not enclosed in parentheses are the actual inventory. The sales quantity 8574 is the value of the sales plan. In addition, the purchased quantity 8573 and the inventory plan 8575 are the values that are planned before one unit period, and in the example in FIG. 10, they show the plan of the purchase and the inventory planed at the time of "2021/03/22". The value enclosed in parentheses of the actual inventory 8576 is the inventory forecast value obtained by calculating receipts and payments (inventory units in N−1+purchased quantity in N−actual sales quantity in N) using the actual inventory as well as the purchase and sales plan.

Next, the order quota calculation and disclosure unit 5000 calculates the deviation between the total inventory plan (8555, 8565, 8575), which are those of each channel and the entire channel planned in the past for one unit period, and the actual inventory and forecast values (8556, 8566, 8576), and outputs it as the surplus inventory (8557, 8567, 8577), respectively. However, since this is a calculation of the number of surplus units, when the deviation is a negative value, the order quota calculation and disclosure unit 5000 treats the surplus inventory as zero. For example, in calculation example 8550, the order quota calculation and disclosure unit 5000 calculates the actual inventory 8556–the inventory plan 8555="85"−"70"="1.5" as the surplus inventory for the record whose period 8552 is "actual". In the calculation example 8560, it follows that the actual inventory 8566–the inventory plan 8565="40"−"50"="−10". Since the deviation is negative, the order quota calculation and disclosure unit 5000 sets the surplus inventory to zero.

Next, the order quota calculation and disclosure unit 5000 calculates the minimum value of the surplus inventory within the calculated period (which may be a predetermined period) for the total channel, each sales channel, and each product as the surplus inventory of the channel. In the case of the example in FIG. 10, the minimum value is +15 for ABC Electric Company, 0 for Supermarket DEF, and 415 for the total channel.

Next, the order quota calculation and disclosure unit 5000 adds up the surplus inventories that are calculated for each sales channel. In the case where only the two companies listed in FIG. 10 are included in the sales channel, it follows that the surplus inventory 15 of "ABC Electric Company"+ the surplus inventory 0 of "Supermarket DEF" 15.

The order quota calculation and disclosure unit 5000 compares the value (15) calculated by adding up the surplus inventory calculated for each sales channel and the inventory margin (15) calculated for the total channels, and uses the smaller value, or the value of the same values, as the final surplus inventory (15 in this example).

Then, the order quota calculation and disclosure unit 5000 sets the surplus inventory of the demand forecast channel as the maximum order quota of the non-demand forecast channel (step S600). For example, in the example in FIG. 10, the order quota calculation and disclosure unit 5000 transfers the final surplus inventory (15) calculated in step S500 to the maximum order quota of the non-demand forecast channel.

Then, the order quota calculation and disclosure unit 5000 calculates the disclosed quota based on the past actual order performance and the maximum order quota for the non-demand forecast channel (step S700). Specifically, the order quota calculation and disclosure unit 5000 first calculates the demand scale for the non-demand forecast channel based on actual order performance. For example, the order quota calculation and disclosure unit 5000 may use the average of the past order performance of the non-demand forecast channel as the demand scale, or it may use a value calculated by other commonly used demand forecasting methods such as exponential smoothing or machine learning. Then, the order quota calculation and disclosure unit 5000 uses the smaller one of the calculated value of the demand scale and the maximum order quota calculated in step S600 as the disclosed quota. In the example in FIG. 10, when the calculated demand scale is 5, and even when the maximum order quota is 15, the order quota calculation and disclosure unit 5000 uses 5, which is smaller one, as the disclosed quota.

Next, the actual order acquisition and delivery date answering unit 6000 acquires the actual order from the non-demand forecast channel. (step S800). Specifically, the actual order acquisition and delivery date answering unit 6000 acquires information on the order quantity with the actual order from the non-demand forecast channel and stores it in the actual order information storage unit 8600.

Then, the actual order acquisition and delivery date answering unit 6000 determines, for each actual order acquired in step S800, whether the order quantity is within the disclosed quota (step S900). Specifically, the actual order acquisition and delivery date answering unit 6000 compare the number of orders placed in the actual order with the number of orders placed in the disclosed quota. When the relationship of magnitude between "the number of orders placed in the actual order 5 the number of orders placed in the disclosed quota" is established, the actual order acquisition and delivery date answering unit 6000 judges that it is within the disclosed quota.

When the order quantity is within the disclosed quota (in the case of "Yes" in step 3900), the actual order acquisition and delivery date answering unit 6000 applies the order quota to the order to fulfill the order, and gives a delivery date answer of "deliverable" (step S910).

The actual order acquisition and delivery date answering unit 6000 updates the disclosed quota (step S920). Specifically, the actual order acquisition and delivery date answering unit 6000 updates the value obtained by subtracting the order quantity applied in step S910 from the maximum order quota of the non-demand forecast channel calculated in step S700 as a new maximum order quota, and set the smaller one of the updated maximum order quota and the demand scale calculated in step S800 as the value of the updated disclosed quota. For example, when the initial maximum order quota is 15, the demand scale is 5, and the number of orders applied in step S910 is 3, the actual order acquisition and delivery date answering unit 6000 updates the maximum order quota to 15−3=12, and set the new disclosed quota as 5, which is the smaller value compared to the demand scale of 5 (in this example, the disclosed quota remains unchanged).

Then, the actual order acquisition and delivery date answering unit 6000 determines whether another actual order exists (step S950). When there is other actual order (in the case of "Yes" in step S950), the actual order acquisition and delivery date answering unit 6000 returns control to step S800. When there is no other actual order (in the case of "No" in step S950), the actual order acquisition and delivery date answering unit 6000 terminates the delivery date answering process.

When the order quantity is not within the disclosed quota (in the case of "No" in step S900), the actual order acquisition and delivery date answering unit 6000 gives a delivery date answer of "undeliverable" for the order (step S930).

Then, the actual order acquisition and delivery date answering unit 6000 returns control to step S950.

FIG. 11 shows an example of a disclosed quota display screen for a product supplier. The disclosed quota display screen 8700 includes a model selection input area 8710 and a disclosed quota display area 8720. The model selection input area 8710 accepts input of model names and displays information such as the order quota and the inventory plans for each demand forecast channel for that model. The disclosed quota display area 8720 displays the number of quotas to be disclosed as available for sale to the non-demand forecast channel (the number of quotas to be disclosed updated in step S920).

Figure 12:
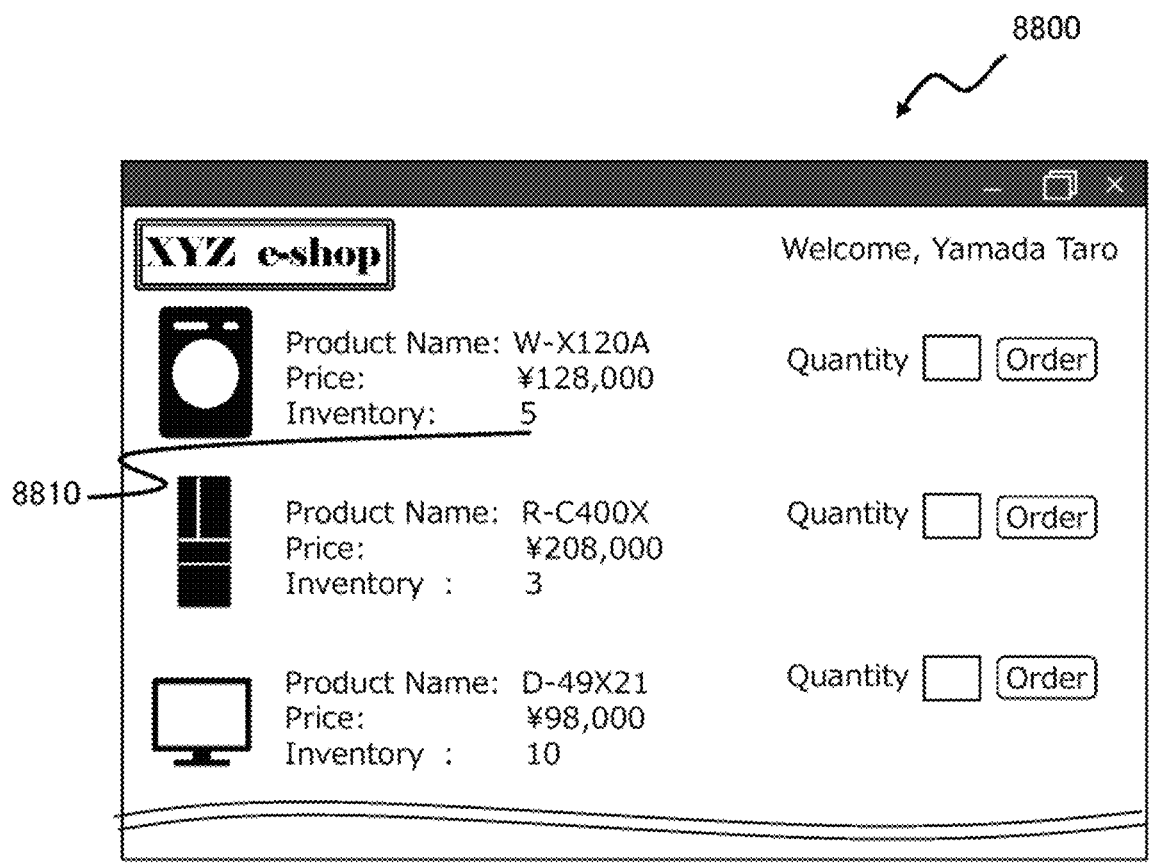
FIG. 12 shows an example of an order acceptance screen for a non-demand forecast channel.

FIG. 12 shows an example of an order acceptance screen for a non-demand forecast channel. The order acceptance screen 8800 is generated by the order quota calculation and disclosure unit 5000, and displays a handling quantity display area 8810 for each product to be sold as information indicating the maximum sales quantity at the time of order placement. The handling number display area 8810 displays the number of quota (disclosed quota updated in step S920) that can be sold to the above-described non-demand forecast channel.

The above is an example of the configuration of the delivery date answering apparatus according to the first embodiment. According to the delivery date answering apparatus 100 of the first embodiment, it is possible to appropriately perform the reserve and delivery date answering for sales channels that do not have demand estimates.

The present invention is not limited to the above examples, but includes various variations. For example, the above embodiments are described in detail for the purpose of clearly explaining the invention, and are not necessarily limited to those having all the described configurations. It is possible to replace some of the configurations of the embodiments with other configurations. It is also possible to delete some of the configurations of the embodiments.

In addition, each of the above elements, configurations, functions, processing units and the like may be realized in hardware by designing some or all of them, for example, in an integrated circuit. In addition, each of the above elements, configurations, functions, and the like may be realized in software by a processor interpreting and executing a program that realizes the respective function. Programs, tables, files, and other information that realize each function may be placed in a memory, a recording device such as a hard disk, or a storage medium such as an IC card, SD card, DVD, and the like.

The control lines and information lines for the above embodiments are those considered necessary for explanation, and not all control lines and information lines are necessarily shown in the product. In reality, almost all configurations may be considered to be interconnected. As described above, the present invention is explained while focusing on the embodiments.

REFERENCE SIGN LIST

100: delivery date answering apparatus, 1000: actual inventory acquisition unit, 2000: demand forecast channel sales plan acquisition unit, 3000: demand forecast channel provisional order acquisition unit, 4000: supply plan update unit, 5000: order quota calculation and disclosure unit, 6000: actual order acquisition and delivery date answering unit, 7000: input/output interface unit, 8000: memory unit, 8100: demand forecast channel actual inventory storage unit, 8200: demand forecast channel sales plan storage unit, 8300: demand forecast channel provisional order information storage unit, 8400: supply plan storage unit, 8600: actual order information storage unit.

The invention claimed is:

1. A delivery date answering apparatus for improving an estimation of an order quantity to be provided to a non-demand forecast channel comprising:
    a communication interface that receives data from the non-demand forecast channel and at least one demand forecast channel;
    a memory that stores the data of the non-demand forecast channel and the at least one demand forecast channel;
    a display;
    a processor that is communicatively coupled to the communication interface, the memory, and the display, wherein the processor is configured to:
    calculate a surplus inventory of a product in the at least one demand forecast channel, which is a sales channel for which order quantities are forecasted, by using an actual inventory and a sales plan of the at least one demand forecast channel, and transfer the surplus inventory to an orderable quota for the non-demand forecast channel, which is a sales channel for which order quantities are not forecasted, and set a predetermined disclosed quota for the orderable quota,
    determine whether an order quantity of an actual order acquired in the non-demand forecast channel is within a range of the predetermined disclosed quota and, when the actual order is within the range, answer a delivery date as the actual order is deliverable at a designated time and, when the actual order is not within the range, answer the delivery date as the actual order is undeliverable at the designated time, and
    display to the at least one demand forecast channel and the non-demand forecast channel, using the display, the communication interface that includes the order quantity and the predetermined disclosed quota for the orderable quota,
    wherein based upon the determination, the order quantity is provided at the designated time to the non-demand forecast channel and within the range of the predetermined disclosed quota.

2. The delivery date answering apparatus according to claim 1, wherein the processor is further configured to set the disclosed quota according to smaller one of the orderable quota and a demand scale of the non-demand forecast channel.

3. The delivery date answering apparatus according to claim 1, wherein the processor is further configured to calculate the surplus inventory of the product according to smaller one of a minimum value of the inventory within a predetermined period in each sales channel constituting the at least one demand forecast channel and a minimum value of the inventory in the at least one demand forecast channel within the predetermined period.

4. The delivery date answering apparatus according to claim 1, wherein the processor is further configured to generate an order acceptance screen with the disclosed quota as an upper limit of a sales quantity.

5. The delivery date answering apparatus according to claim 1, further comprising:
    an actual inventory acquisition unit configured to acquire the actual inventory in the at least one demand forecast channel from an other apparatus via a network.

6. The delivery date answering apparatus according to claim 1, further comprising:

a demand forecast channel sales plan acquisition unit configured to acquire the sales plan of the at least one demand forecast channel from an other apparatus via a network.

7. A delivery date answering method for improving an estimation of an order quantity to be provided to a non-demand forecast channel, the method comprising:

providing:
- a communication interface that receives data from the non-demand forecast channel and at least one demand forecast channel;
- a memory that stores the data of the non-demand forecast channel and the at least one demand forecast channel;
- a display; and
- a processor that is communicatively coupled to the communication interface, the memory, and the display, wherein the method further comprises:

calculating a surplus inventory of a product in the at least one demand forecast channel, which is a sales channel for which order quantities are forecasted, by using an actual inventory and a sales plan of the at least one demand forecast channel, and transferring the surplus inventory to an orderable quota for a non-demand forecast channel, which is a sales channel for which order quantities are not forecasted, and setting a predetermined disclosed quota for the orderable quota, determining whether an order quantity of an acquired actual order is within a range of the disclosed quota and, when the actual order is within the range, answering a delivery date as the actual order is deliverable at a designated time and, when the actual order is not within the range, answering the delivery date as the actual order is undeliverable at a designated time, and displaying to the at least one demand forecast channel and the non-demand forecast channel, using the display, the communication interface that includes the order quantity and the predetermined disclosed quota for the orderable quota, wherein based upon the determination, the order quantity is provided at the designated time to the non-demand forecast channel and within the range of the predetermined disclosed quota.

* * * * *